(12) United States Patent
Takehira

(10) Patent No.: US 10,516,172 B2
(45) Date of Patent: Dec. 24, 2019

(54) CATALYST INK FOR FUEL CELL, CATALYST LAYER FOR FUEL CELL, AND MEMBRANE ELECTRODE ASSEMBLY

(71) Applicant: TOYOTA JIDOSHA KABUSHIKI KAISHA, Toyota-shi, Aichi-ken (JP)

(72) Inventor: Yuichi Takehira, Mishima (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/908,340

(22) Filed: Feb. 28, 2018

(65) Prior Publication Data

US 2018/0254492 A1    Sep. 6, 2018

(30) Foreign Application Priority Data

Mar. 3, 2017    (JP) ................................. 2017-040814

(51) Int. Cl.
| | |
|---|---|
| *H01M 4/96* | (2006.01) |
| *H01M 4/88* | (2006.01) |
| *H01M 4/86* | (2006.01) |
| *H01M 8/1004* | (2016.01) |

(52) U.S. Cl.
CPC ........... *H01M 4/96* (2013.01); *H01M 4/8663* (2013.01); *H01M 4/8668* (2013.01); *H01M 4/8828* (2013.01); *H01M 8/1004* (2013.01)

(58) Field of Classification Search
CPC .... H01M 4/96; H01M 4/8663; H01M 4/8668; H01M 4/8828; H01M 8/1004
See application file for complete search history.

(56) References Cited

U.S. PATENT DOCUMENTS

| | | | | |
|---|---|---|---|---|
| 2003/0072991 | A1* | 4/2003 | Matsubara | H01M 4/8605 429/523 |
| 2010/0009240 | A1* | 1/2010 | Fly | H01M 4/8605 429/494 |
| 2014/0193741 | A1 | 7/2014 | Sung et al. | |
| 2014/0220459 | A1 | 8/2014 | Iida et al. | |
| 2014/0356767 | A1 | 12/2014 | Kimura et al. | |
| 2016/0194462 | A1* | 7/2016 | Wada | D21H 11/18 524/35 |

FOREIGN PATENT DOCUMENTS

| | | |
|---|---|---|
| CA | 2407202 A1 | 4/2003 |
| JP | 2001216972 A | 8/2001 |
| JP | 2003123769 A | 4/2003 |
| JP | 2004113848 A | 4/2004 |
| JP | 2010238513 A | 10/2010 |

(Continued)

OTHER PUBLICATIONS

English machine translation of Okada (JP 2014067537 A) (Year: 2014).*

*Primary Examiner* — Stewart A Fraser
(74) *Attorney, Agent, or Firm* — Hunton Andrews Kurth LLP

(57) ABSTRACT

Provided are a catalyst ink for a fuel cell, which secures both the viscosity of the catalyst ink and the electricity generation performance of a fuel cell produced by using the catalyst ink, a catalyst layer for a fuel cell, and a membrane electrode assembly. The catalyst ink for a fuel cell may contain a catalyst-supporting support, an ionomer that is proton conductive, and cellulose-based nanofibers.

12 Claims, 8 Drawing Sheets

(56) References Cited

FOREIGN PATENT DOCUMENTS

| | | | |
|---|---|---|---|
| JP | 2014067537 A | * | 4/2014 |
| JP | 2014154225 A | | 8/2014 |
| JP | 2014522552 A | | 9/2014 |
| JP | 2014199742 A | | 10/2014 |
| JP | 5939695 B1 | | 6/2016 |
| JP | 2016122594 A | | 7/2016 |
| KR | 1020110002127 A | | 1/2011 |
| KR | 101392812 B1 | | 5/2014 |
| WO | 2013121781 A1 | | 8/2013 |
| WO | 2016111165 A1 | | 7/2016 |

* cited by examiner

CATALYST INK FOR FUEL CELL, CATALYST LAYER FOR FUEL CELL, AND MEMBRANE ELECTRODE ASSEMBLY

CROSS-REFERENCE TO RELATED APPLICATION

The present application claims priority to Japanese Patent Application No. 2017-040814 filed on Mar. 3, 2017, which is incorporated herein by reference in its entirety.

TECHNICAL FIELD

The disclosure relates to a catalyst ink for a fuel cell, a catalyst layer for a fuel cell, and a membrane electrode assembly.

BACKGROUND

There has been considerable research on increasing the productivity and electricity generation performance of a fuel cell.

For example, Patent Literature 1 discloses an aqueous catalyst paste composition for fuel batteries and a catalyst ink composition which are adequate in the dispersibility of a catalyst-supporting carbon material, low in viscosity, and superior in storage stability and the adsorption rate of a proton-conducting polymer, and which have the suitability to coating.

Patent Literature 1: Japanese Patent Application Laid-Open (JP-A) No. 2016-122594
Patent Literature 2: JP-A No. 2010-238513
Patent Literature 3: JP-A No. 2004-113848
Patent Literature 4: International Publication No. WO2013/121781
Patent Literature 5: JP-A No. 2014-154225
Patent Literature 6: Japanese translation of PCT international application No. 2014-522552

However, the catalyst ink composition described in Patent Literature 1 has a problem in that it is difficult to secure both the viscosity of a catalyst ink and the electricity generation performance of a fuel cell produced by using the catalyst ink.

SUMMARY

The disclosed embodiments were achieved in light of the above circumstance. An object of the disclosed embodiments is to provide a catalyst ink for a fuel cell, which secures both the viscosity of the catalyst ink and the electricity generation performance of a fuel cell produced by using the catalyst ink, a catalyst layer for a fuel cell, and a membrane electrode assembly.

In a first embodiment, there is provided a catalyst ink for a fuel cell, comprising a catalyst-supporting support, an ionomer that is proton conductive, and cellulose-based nanofibers.

A mass ratio (F/I) of the cellulose-based nanofibers (F) to the ionomer (I) may be more than 0 and less than or equal to 0.4 ($0<(F/I)\leq0.4$).

The cellulose-based nanofibers may be one or more kinds of fibers selected from the group consisting of cellulose nanofibers containing an unsubstituted hydroxy group, cellulose nanofibers containing a hydroxy group substituted with an acetyl group or a derivative thereof, cellulose sulfate nanofibers, cellulose phosphate nanofibers, and cellulose nanofibers containing a hydroxy group substituted with a C1-C10 alkyl group or a derivative thereof.

The ionomer may be a perfluorosulfonic acid-based resin.

A viscosity of the catalyst ink measured by an E type viscometer at a shear rate of 150 (1/s) may be from 30 mPa·s to 180 mPa·s.

A polymerization degree of the cellulose-based nanofibers may be from 200 to 750.

The mass ratio (F/I) of the cellulose-based nanofibers (F) to the ionomer (I) may be more than 0 and less than or equal to 0.2 ($0\leq(F/I)\leq0.2$), and the polymerization degree of the cellulose-based nanofibers may be from 200 to 300.

In another embodiment, there is provided a catalyst layer for a fuel cell, comprising a catalyst-supporting support, an ionomer that is proton conductive, and cellulose-based nanofibers.

A mass ratio (F/I) of the cellulose-based nanofibers (F) to the ionomer (I) may be more than 0 and less than or equal to 0.4 ($0<(F/I)\leq0.4$).

The cellulose-based nanofibers may be one or more kinds of fibers selected from the group consisting of cellulose nanofibers containing an unsubstituted hydroxy group, cellulose nanofibers containing a hydroxy group substituted with an acetyl group or a derivative thereof, cellulose sulfate nanofibers, cellulose phosphate nanofibers, and cellulose nanofibers containing a hydroxy group substituted with a C1-C10 alkyl group or a derivative thereof.

The ionomer may be a perfluorosulfonic acid-based resin.

A polymerization degree of the cellulose-based nanofibers may be from 200 to 750.

The mass ratio (F/I) of the cellulose-based nanofibers (F) to the ionomer (I) may be more than 0 and less than or equal to 0.2 ($0<(F/I)\leq0.2$), and the polymerization degree of the cellulose-based nanofibers may be from 200 to 300.

In another embodiment, there is provided a membrane electrode assembly comprising: a cathode electrode containing a cathode catalyst layer; an anode electrode containing an anode catalyst layer; and an electrolyte layer disposed between the cathode catalyst layer and the anode catalyst layer, wherein at least one of the cathode catalyst layer and the anode catalyst layer is the catalyst layer for a fuel cell.

According to the disclosed embodiments, the coatability of a catalyst ink can be better, and a decrease in electricity generation performance of a fuel cell can be prevented.

DETAILED DESCRIPTION

1. Catalyst Ink for a Fuel Cell

The catalyst ink for a fuel cell according to the disclosed embodiments comprises a catalyst-supporting support, an ionomer that is proton conductive, and cellulose-based nanofibers.

To obtain battery characteristics, a catalyst ink used for the production of fuel cell electrodes is needed to be highly dispersive. As used herein, "highly dispersive" means that the particle diameter of the catalyst-supporting support is small and the support in the ink is covered with the ionomer and stably keeps its particle diameter without reaggregation or precipitation.

Meanwhile, in a fuel cell production process, the viscosity of the catalyst ink also serves as an important measure to obtain coatability. If the viscosity is too low, there is a problem of ink dripping. If the viscosity is too high, there is a problem of low leveling properties, etc., and the properties of the coated surface are affected.

Figure 1:
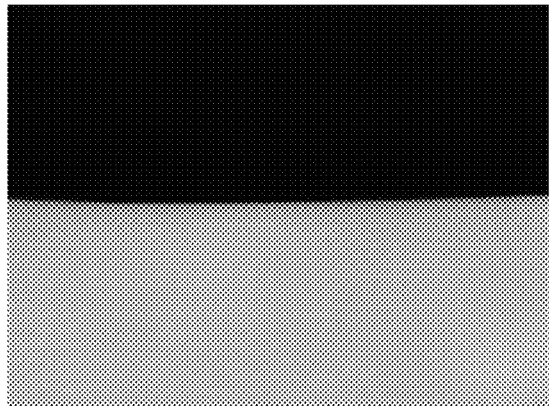
FIG. 1 is an optical micrograph of an example of a surface successfully coated with a catalyst ink.
Figure 2:
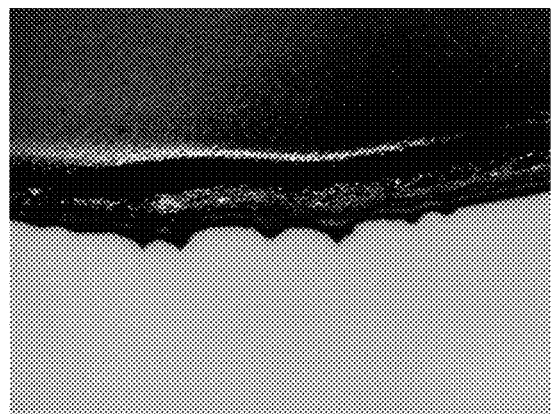
FIG. 2 is an optical micrograph of an example of a surface poorly coated with a catalyst ink.

As used herein, "ink dripping" means the following: when the catalyst ink is applied, due to low viscosity and high fluidity of the ink, the applied ink cannot keep its shape, and the resulting coating film has an extrusion or becomes non-uniform in thickness during drying and, as a result, thick and thin parts may occur in the coating film (see FIGS. 1 and 2).

FIG. 1 is an optical micrograph of an example of an electrode surface successfully coated with such a catalyst ink that the viscosity at a shear rate of 150 (1/s) is 30 mPa·s.

FIG. 2 is an optical micrograph of an example of an electrode surface poorly coated with such a catalyst ink that the viscosity at a shear rate of 150 (1/s) is 10 mPa·s. As shown in FIG. 2, it is clear that catalyst ink dripping occurs when the viscosity of the catalyst ink is low.

Figure 3:
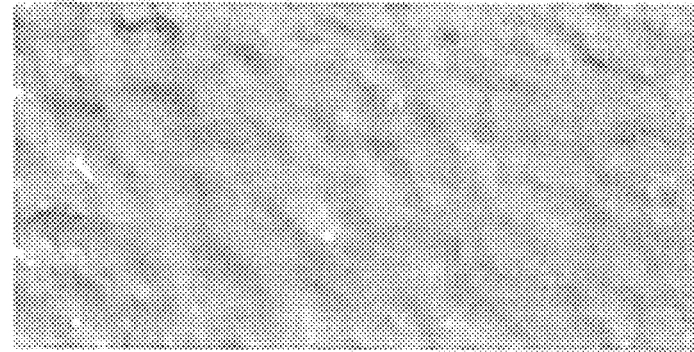
FIG. 3 is an optical micrograph of an example of a catalyst ink-coated surface with poor leveling properties.

Also, "low leveling properties" means the following: when the viscosity of the catalyst ink is high, the fluidity of the ink is low; therefore, an ink-coated surface of a substrate cannot be smooth and becomes uneven (see FIG. 3).

FIG. 3 is an optical micrograph of an example of a catalyst ink-coated surface with poor leveling properties.

In general, the dispersibility of the catalyst ink increases as the viscosity of the ink decreases. Therefore, the viscosity of the catalyst ink contradicts the dispersibility. When the viscosity of the catalyst ink is controlled by adding an additive that is generally used in a catalyst ink, such as polyvinyl alcohol, to the catalyst ink, there is a problem in that the electricity generation performance of a fuel cell obtained by using the catalyst ink may decrease.

It was found that the coatability of a catalyst ink can be better by controlling the viscosity of the catalyst ink by adding the cellulose-based nanofibers to the catalyst ink, and a decrease in the electricity generation performance of a fuel cell obtained by using the catalyst ink, can be suppressed.

It was also found that by using the cellulose-based nanofibers having the predetermined polymerization degree in the catalyst ink, a fuel cell obtained by using the catalyst ink shows excellent electricity generation performance, even in a low humidity-high load condition.

This is presumed to be because, in the case of using the cellulose-based nanofibers, while a reaction gas supply path to the catalyst is secured by the three dimensional structure of the cellulose-based nanofibers, the desired dispersibility of the catalyst can be maintained, and the viscosity of the catalyst ink can be secured.

The catalyst may contain at least one selected from the group consisting of platinum and a platinum alloy.

As the platinum alloy, examples include, but are not limited to, an alloy of platinum and a metal material selected from the group consisting of iridium, ruthenium, rhodium, nickel and gold. The metal material constituting the platinum alloy may be one or more kinds of metals.

The content of the platinum may account for 90 mass % or more of the total mass of the platinum alloy. This is because sufficient catalytic activity and durability cannot be obtained when the content of the platinum accounts for less than 90 mass %.

The catalyst may be a core-shell catalyst containing a so-called core-shell structure that comprises a core containing a core metal and a shell containing platinum and covering at least a part of the core.

In the disclosed embodiments, the shell covering the core means not only a configuration in which the whole surface of the core is covered with the shell, but also a configuration in which at least a part of the core surface is covered with the shell and a part of the core surface is exposed. Also, the shell may be a monoatomic layer or atomic layers composed of two or more stacked atoms. From the viewpoint of increasing catalytic activity, the shell is preferably a monoatomic layer.

The core metal may be at least one selected from the group consisting of palladium and a palladium alloy, and it may be palladium.

As the palladium alloy, examples include, but are not limited to, an alloy of palladium and a metal material selected from the group consisting of tungsten, iridium, ruthenium, rhodium, iron, cobalt, nickel, silver and gold. The metal material constituting the palladium alloy may be one or more kinds of metals.

In the case of using the palladium alloy, the palladium content may account for 30 mass % or more of the total mass of the alloy. This is because, since the palladium content is 30 mass % or more, a platinum-containing shell that is uniform in thickness can be formed.

The shell metal material constituting the core-shell catalyst is not particularly limited, as long as it contains at least one selected from platinum and a platinum alloy.

The form of the catalyst is not particularly limited. As the form, examples include, but are not limited to, a plate form and a particle form.

The average particle diameter of the catalyst particles is not particularly limited. It may be 3 nm or more (particularly 3.5 nm or more) and 10 nm or less (particularly 5 nm or less).

In the disclosed embodiments, the average particle diameter of the particles is calculated by a general method, unless otherwise stated. An example of the method for calculating the average particle diameter of the particles, is as follows. First, for a particle shown in an image taken at an appropriate magnitude (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

The support may be an electroconductive support from the viewpoint of providing, when the catalyst is used in an electrocatalyst layer of a fuel cell, electroconductivity to the electrocatalyst layer.

As the material for the support, examples include, but are not limited to, electroconductive carbonaceous materials including carbon particles and carbon fibers, such as Ketjen Black (product name, manufactured by Ketjen Black International Company), Vulcan (product name, manufactured by Cabot), Norit (product name, manufactured by Norit), Black Pearls (product name, manufactured by Cabot) and Acetylene Black (product name, manufactured by Chevron); metal materials including metal particles and metal fibers; and non-electroconductive materials including organic pigments, such as perylene red.

The average particle diameter of the support is not particularly limited. It may be from 0.01 μm to hundreds of μm or from 0.01 μm to 1 μm. When the average particle diameter of the support is less than the range, the support may corrode and deteriorate, and the core metal particles supported on the support may be detached over time. When the average particle diameter of the support is more than the range, the specific surface area of the support is small and may decrease the dispersibility of the catalyst.

The catalyst can be supported on the support by a conventional method. As the method, examples include, but are not limited to, the following method: a support dispersion in which the support is dispersed, is prepared; the dispersion liquid is mixed with the catalyst; and the mixture is filtered, washed, re-dispersed in ethanol or the like, and dried with a vacuum pump or the like, thereby supporting the catalyst on the support. After the drying, the resulting catalyst-supporting support may be heated as needed.

The ionomer is not particularly limited, as long as it is an ionomer that is proton conductive. For example, the ionomer may be a perfluorosulfonic acid-based resin.

The content of the ionomer in the catalyst ink can be appropriately determined depending on the amount of the catalyst-supporting support.

The cellulose-based nanofibers can be, for example, one or more kinds of fibers selected from the group consisting of cellulose nanofibers containing an unsubstituted hydroxy group, cellulose nanofibers containing a hydroxy group substituted with an acetyl group or a derivative thereof, cellulose sulfate nanofibers, cellulose phosphate nanofibers, and cellulose nanofibers containing a hydroxy group substituted with a C1-C10 alkyl group or a derivative thereof. Of them, the cellulose-based nanofibers can be cellulose nanofibers containing an unsubstituted hydroxy group.

The average fiber diameter of the cellulose-based nanofibers may be from 20 nm to 50 nm, for example.

The specific surface area of the cellulose-based nanofibers may be from 120 $m^2/g$ to 150 $m^2/g$, for example.

The polymerization degree of the cellulose-based nanofibers may be 200 or more and 750 or less, for example. From the viewpoint of increasing the low humidity performance of a fuel cell, it may be 200 or more and 300 or less.

When the polymerization degree is 200 or more and 750 or less, the physical properties of the cellulose-based nanofibers are considered to be close, and it is presumed that the same effect is obtained.

The amount of the cellulose-based nanofibers dispersed in the catalyst ink for a fuel cell according to the disclosed embodiments, may account for 1 mass % to 30 mass % or 2 mass % to 23 mass % of the total amount of the catalyst ink.

For the catalyst ink for a fuel cell according to the disclosed embodiments, from the viewpoint of obtaining better coatability, the viscosity measured by an E type viscometer at a shear rate of 150 (1/s) may be from 30 mPa·s to 180 mPa·s.

For the catalyst ink for a fuel cell according to the disclosed embodiments, the mass ratio (F/I) of the cellulose-based nanofibers (F) to the ionomer (I) may be more than 0 (0<(F/I)) or may be less than or equal to 0.6 ((F/I)≤0.6). From the viewpoint of increasing the electricity generation performance of a fuel cell, the mass ratio (F/I) may be less than or equal to 0.4 ((F/I)≤0.4).

When the cellulose-based nanofibers with a polymerization degree of 200 or more and 750 or less are used in the catalyst ink for a fuel cell according to the disclosed embodiments, the mass ratio (F/I) may be more than 0 and less than or equal to 0.4 (0<(F/I)≤0.4), may be more than 0 and less than or equal to 0.3 (0<(F/I)≤0.3), or may be more than 0 and less than or equal to 0.2 (0<(F/I)≤0.2), from the viewpoint of increasing the electricity generation performance of a fuel cell.

Also, when the cellulose-based nanofibers with a polymerization degree of 200 or more and 300 or less are used in the catalyst ink for a fuel cell according to the disclosed embodiments, from the viewpoint of both the low humidity performance and high humidity performance of a fuel cell, the mass ratio (F/I) may be more than 0 and less than or equal to 0.4 (0<(F/I)≤0.4), may be more than 0 and less than or equal to 0.3 (0<(F/I)≤0.3), may be more than 0 and less than or equal to 0.2 (0<(F/I)≤0.2), or may be more than or equal to 0.05 and less than or equal to 0.2 (0.05≤(F/I)≤0.2).

In general, the catalyst ink for a fuel cell according to the disclosed embodiments is obtained by dispersing the catalyst-supporting support, the ionomer that is proton conductive and the cellulose-based nanofibers by adding a dispersion medium.

The dispersion medium of the catalyst ink is not particularly limited. It may be appropriately selected depending on the ionomer used, etc. As the dispersion medium, examples include, but are not limited to, alcohols such as methanol, ethanol, propanol and propylene glycol, N,N-dimethylformamide, N,N-diethylformamide, N,N-dimethylacetamide, N,N-diethylacetamide, mixtures thereof, and mixtures thereof with water.

The method for dispersing the catalyst ink is not particularly limited. As the method, examples include, but are not limited to, a homogenizer, a beads mill, a shear mixer and a roll mill.

2. Catalyst Layer for a Fuel Cell

The catalyst layer for a fuel cell according to the disclosed embodiments comprises a catalyst-supporting support, an ionomer that is proton conductive, and cellulose-based nanofibers.

In the disclosed embodiments, the catalyst layer for a fuel cell is applicable to both of cathode and anode catalyst layers described below.

The catalyst layer for a fuel cell according to the disclosed embodiments can be obtained by applying the catalyst ink for a fuel cell to a substrate or electrolyte membrane and drying the applied ink.

The method for applying the catalyst ink and the method for drying the applied ink can be appropriately selected. As the ink applying method, examples include, but are not limited to, a spraying method, a screen printing method, a doctor blade method, a gravure printing method and a die coating method. As the ink drying method, examples include, but are not limited to, drying under reduced pressure, heat drying, and heat drying under reduced pressure. The condition of the drying under reduced pressure and that of the heat drying are not particularly limited, and they may be appropriately determined.

The thickness of the catalyst layer for a fuel cell is not particularly limited and may be from 1 μm to 50 μm.

3. Membrane Electrode Assembly

The membrane electrode assembly according to the disclosed embodiments is a membrane electrode assembly comprising: a cathode electrode containing a cathode catalyst layer; an anode electrode containing an anode catalyst layer; and an electrolyte layer disposed between the cathode catalyst layer and the anode catalyst layer, wherein at least one of the cathode catalyst layer and the anode catalyst layer is the above-described catalyst layer for a fuel cell.

Figure 16:
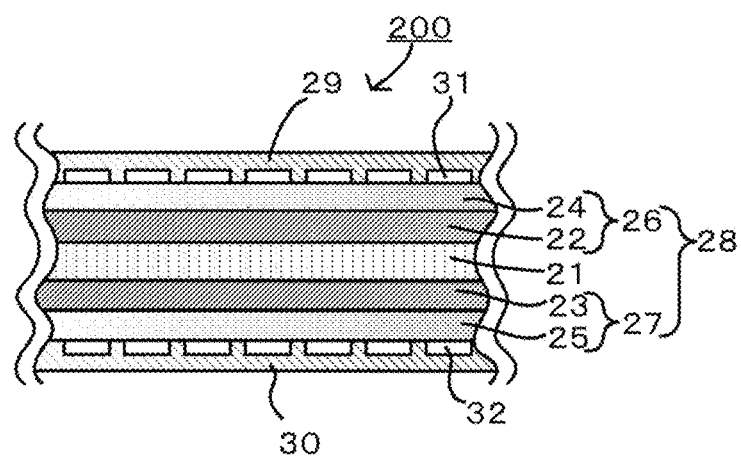
FIG. 16 is a view of an example of a fuel cell comprising a membrane electrode assembly.

FIG. 16 is a view of an example of a fuel cell comprising the membrane electrode assembly of the disclosed embodiments. It is also a schematic sectional view of the membrane electrode assembly cut in the layer laminating direction.

A membrane electrode assembly 28 includes an electrolyte membrane 21 and a pair of a cathode electrode 26 and an anode electrode 27 between which the electrolyte membrane 21 is sandwiched. A fuel cell 200 includes the membrane electrode assembly 28 and a pair of separators 29 and 30 between which the membrane electrode assembly 28 is sandwiched from the outside of the electrodes. Gas channels 31 and 32 are provided at the boundary of the separator 29 and the electrode 26 and the boundary of the separator 30 and the electrode 27, respectively.

The electrodes 26 and 27 have a structure in which a catalyst layer and a gas diffusion layer are stacked in this order from the electrolyte membrane side. That is, the cathode electrode 26 has a structure in which a cathode catalyst layer 22 and a gas diffusion layer 24 are stacked, and the anode electrode 27 has a structure in which an anode catalyst layer 23 and a gas diffusion layer 25 are stacked.

The fuel cell comprising the membrane electrode assembly of the disclosed embodiments may have a structure in which single cells as shown in FIG. 16 are stacked and electrically connected.

The cathode electrode contains at least a cathode catalyst layer.

The cathode catalyst layer may be the catalyst layer for a fuel cell according to the disclosed embodiments. When the anode catalyst layer described below is the catalyst layer for a fuel cell according to the disclosed embodiments, the cathode catalyst layer may be the catalyst layer for a fuel cell according to the disclosed embodiments, or it may be a different catalyst layer. As the different catalyst layer, examples include, but are not limited to, a catalyst layer that does not contain the cellulose-based nanofibers.

As needed, the cathode electrode may contain a gas diffusion layer. When the cathode electrode contains the gas diffusion layer, the structure of the cathode electrode is not particularly limited. In this case, the cathode electrode preferably contains a multilayer structure in which the cathode catalyst layer and the gas diffusion layer are stacked in this order from the closest to the electrolyte membrane.

The anode electrode contains at least an anode catalyst layer.

The material, structure, forming method and thickness of the anode catalyst layer are not particularly limited and may be the same as those of the above-described cathode catalyst layer.

When the cathode catalyst layer is the catalyst layer for a fuel cell according to the disclosed embodiments, the anode catalyst layer may be the catalyst layer for a fuel cell according to the disclosed embodiments, or it may be the above-described different catalyst layer.

As needed, the anode electrode may contain a gas diffusion layer. When the anode electrode contains the gas diffusion layer, the structure and material of the anode electrode are not particularly limited, and the same structure and material as the above-mentioned cathode electrode may be used.

The electrolyte layer contains at least an electrolyte membrane.

As the electrolyte membrane, examples include, but are not limited to, a fluorine-based polymer electrolyte membrane containing a fluorine-based polymer electrolyte, such as a perfluorosulfonic acid polymer-based electrolyte membrane (e.g., Nafion (trademark, manufactured by DuPont)) and a hydrocarbon-based polymer electrolyte membrane containing a hydrocarbon-based polymer electrolyte obtained by introducing a protonic acid group (proton conductive group) such as sulfonic acid group, carboxylic acid group, phosphate group or boronic acid group to a hydrocarbon-based polymer such as an engineering plastic (e.g., polyether ether ketone, polyether ketone, polyether sulfone, polyphenylene sulfide, polyphenylene ether, polyparaphenylene) or a commodity plastic (e.g., polyethylene, polypropylene, polystyrene).

The gas diffusion layer comprises a gas diffusion layer sheet. The gas diffusion layer sheet is needed to be a material with (1) gas diffusivity that allows efficient fuel supply to the catalyst layer, (2) electroconductivity and (3) strength required of a material constituting the gas diffusion layer. As the gas diffusion layer sheet, examples include, but are not limited to, a sheet made of an electroconductive porous material. As the electroconductive porous material, examples include, but are not limited to, carbonaceous porous materials such as carbon paper, carbon cloth and carbon felt, and metal mesh and metal porous materials made of metals such as titanium, aluminum, nickel, nickel-chromium alloy, copper, copper alloy, silver, aluminum alloy, zinc alloy, lead alloy, niobium, tantalum, iron, stainless-steel, gold and platinum.

The thickness of the electroconductive porous material may be from 50 µm to 500 µm.

The gas diffusion layer sheet may be a single layer of the above-described electroconductive porous material. Also, a water repellent layer may be provided on a side facing the catalyst layer of the single layer. In general, the water repellent layer has a porous structure that contains an electroconductive powdery granular material (such as carbon particles and carbon fibers), a water repellent resin (such as polytetrafluoroethylene or PTFE), etc. The water repellent layer is not always necessary; however, it has such advantages that the drainage property of the gas diffusion layer can be increased, while keeping the content of water in the catalyst layer and electrolyte membrane at an appropriate level, and electrical contact between the catalyst layer and the gas diffusion layer can be improved.

The catalyst layer formed by the above-described method, the electrolyte membrane and the gas diffusion layer sheet are appropriately stacked and attached to each other by hot-pressing, etc., thereby obtaining a membrane electrode assembly.

The membrane electrode assembly thus produced may be sandwiched between separators, each having a reaction gas channel, to form a single cell.

The separators are not particularly limited, as long as they can form the reaction gas channel that is used for an electrochemical reaction in the catalyst layer. As the separators, examples include, but are not limited to, carbon separators containing a high concentration of carbon fibers and comprising a composite material with a resin, and metal separators comprising a metal material. As the metal separators, examples include, but are not limited to, separators comprising a metal material with excellent corrosion resistance and separators coated with carbon or a metal material with excellent corrosion resistance to increase corrosion resistance.

The method for producing the membrane electrode assembly of the disclosed embodiments, is not particularly limited. As the method, examples include, but are not limited to, the following method: the catalyst layer for a fuel cell is formed on a substrate by applying the catalyst ink for a fuel cell to the substrate, and the catalyst layer formed on the substrate is transferred to the electrolyte membrane.

The method for transferring the catalyst layer to the electrolyte membrane is not particularly limited. As the method, examples include, but are not limited to, the following thermal transfer method: the catalyst layer and the electrolyte membrane are attached by hot-pressing or the like, followed by removal of the substrate of the catalyst layer, thereby transferring the catalyst layer on the electrolyte membrane.

For the heating temperature of the thermal transfer, the proper heating temperature varies depending on the electrolyte membrane used. It may be from 110° C. to 160° C. or from 140° C. to 150° C.

When the heating temperature is in the range, the pressure of the hot-pressing may be from 2 MPa to 12 MPa or from 4 MPa to 8 MPa.

The time to keep the heating temperature and the applied pressure (the transferring time) may be from 5 to 20 minutes or from 10 to 15 minutes.

EXAMPLES

Example 1

<Production of Catalyst Ink>

First, 2 g of a catalyst-supporting support (Pt/C) comprising carbon black (Ketjen Black) as the support and 30 mass % Pt as the catalyst supported thereon, was prepared. Then, 14.8 g of water was added to the Pt/C and stirred. Next, 5.4 g of ethanol was further added thereto and stirred. Then, DE2020 (a perfluorosulfonic acid ionomer manufactured by DuPont) was prepared as an ionomer, added to the mixture at a mass ratio of 1:1 (ionomer:support) and stirred. Next, cellulose nanofibers containing an unsubstituted hydroxy group (product name: WMa-100, manufactured by: Sugino Machine Limited, polymerization degree: 650) were prepared as cellulose-based nanofibers. The cellulose nanofibers (F) were added so that they were 20 mass % (F/I=0.2) with respect to the mass of the ionomer (I). Then, the cellulose nanofibers (F) were dispersed by an ultrasonic homogenizer (product name: Digital Sonifer S250D, manufactured by: BRANSON, output: 50%) for 20 minutes, thereby producing a catalyst ink.

Example 2

A catalyst ink was produced in the same manner as Example 1, except that WMa-100 was added as the cellulose-based nanofibers so that they were 30 mass % (F/I=0.3) with respect to the mass of the ionomer.

Example 3

A catalyst ink was produced in the same manner as Example 1, except that WMa-100 was added as the cellulose-based nanofibers so that they were 40 mass % (F/I=0.4) with respect to the mass of the ionomer.

Example 4

A catalyst ink was produced in the same manner as Example 1, except that WMa-100 was added as the cellulose-based nanofibers so that they were 60 mass % (F/I=0.6) with respect to the mass of the ionomer.

Comparative Example 1

A catalyst ink was produced in the same manner as Example 1, except that the cellulose-based nanofibers were not added.

Example 5

<Production of Catalyst Ink>

First, 2 g of a catalyst-supporting support (Pt/C) comprising carbon black (Ketjen Black) as the support and 30 mass % Pt as the catalyst supported thereon, was prepared. Then, 11.9 g of water was added to the Pt/C and stirred. Next, 3.5 g of ethanol was further added thereto and stirred. Then, DE2020 (a perfluorosulfonic acid ionomer manufactured by DuPont) was prepared as an ionomer, added to the mixture at a mass ratio of 1:1 (ionomer:support) and stirred. Next, cellulose nanofibers containing an unsubstituted hydroxy group (product name: AMa-100, manufactured by: Sugino Machine Limited, polymerization degree: 200) were prepared as cellulose-based nanofibers. The cellulose nanofibers were added so that they were 5 mass % (F/I=0.05) with respect to the mass of the ionomer. Then, the cellulose nanofibers were dispersed by an ultrasonic homogenizer (product name: Digital Sonifer S250D, manufactured by: BRANSON, output: 50%) for 20 minutes, thereby producing a catalyst ink.

Example 6

A catalyst ink was produced in the same manner as Example 5, except that AMa-100 was added as the cellulose-based nanofibers so that they were 10 mass % (F/I=0.1) with respect to the mass of the ionomer.

Example 7

A catalyst ink was produced in the same manner as Example 5, except that AMa-100 was added as the cellulose-based nanofibers so that they were 20 mass % (F/I=0.2) with respect to the mass of the ionomer.

Example 8

A catalyst ink was produced in the same manner as Example 5, except that AMa-100 was added as the cellulose-based nanofibers so that they were 40 mass % (F/I=0.4) with respect to the mass of the ionomer.

Comparative Example 2

A catalyst ink was produced in the same manner as Example 5, except that the cellulose-based nanofibers were not added.

Comparative Example 3

A catalyst ink was produced in the same manner as Example 1, except that polyvinyl alcohol (PVA) was added in place of the cellulose-based nanofibers so that it was 20 mass % with respect to the mass of the ionomer.
<Production of Fuel Cell>

The catalyst ink produced in Example 1 was applied onto a Teflon (trademark) sheet substrate by a die coater so that the amount of platinum per unit area was 0.1 mg-Pt/cm$^2$, thereby producing a catalyst layer.

Then, the catalyst layer thus produced was hot-pressed to the electrolyte membrane in the following condition, thereby obtaining a cathode catalyst layer.

Temperature: 140° C.
Pressure: 3 MPa
Hot-pressing time: 3 Minutes

Meanwhile, a catalyst ink for an anode catalyst layer was prepared in the same manner as the above-mentioned catalyst ink for a fuel cell, except that the cellulose-based nanofibers were not added.

The catalyst ink for an anode catalyst layer was applied onto a Teflon (trademark) sheet substrate by a die coater so that the amount of platinum per unit area was 0.1 mg-Pt/cm$^2$, whereby an anode catalyst layer was produced. Then, the anode catalyst layer thus produced was hot-pressed to a side opposite to the side on which the cathode catalyst layer was stacked of the electrolyte membrane in the following condition, thereby obtaining a membrane-catalyst layer assembly.

Temperature: 140° C.
Pressure: 3 MPa
Hot-pressing time: 3 Minutes

The membrane-catalyst layer assembly thus obtained was sandwiched between carbon papers for a gas diffusion layer. They were hot-pressed to obtain a membrane electrode assembly.

Also, the membrane electrode assembly was sandwiched between two separators (carbon separators) to produce a fuel cell.

The catalyst inks of Examples 2 to 8 and Comparative Examples 1 to 3 were used for fuel cell production in the same manner as Example 1, thereby producing fuel cells.
<Coatability>

Figure 4:
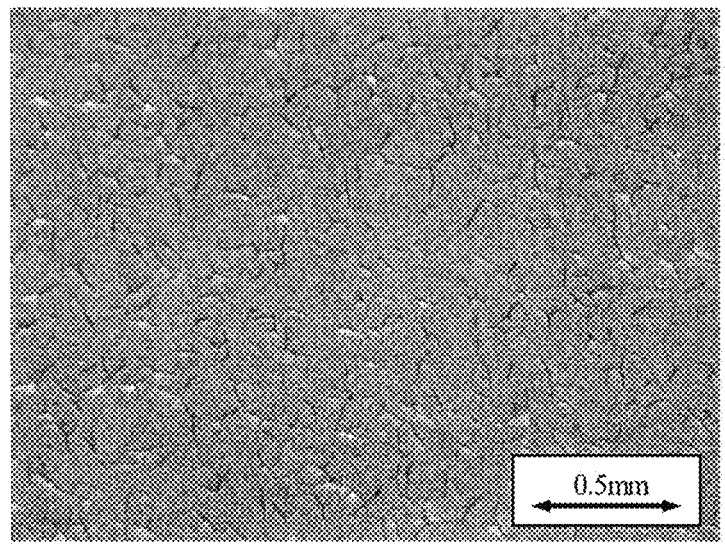
FIG. 4 is an optical micrograph of a substrate surface on which a catalyst ink produced in Comparative Example 1 is applied.
Figure 5:
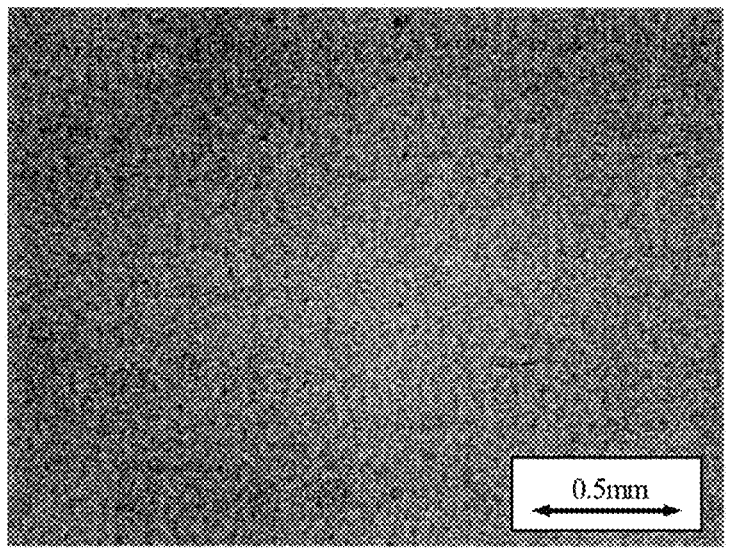
FIG. 5 is an optical micrograph of a substrate surface on which a catalyst ink produced in Example 1 is applied.
Figure 6:
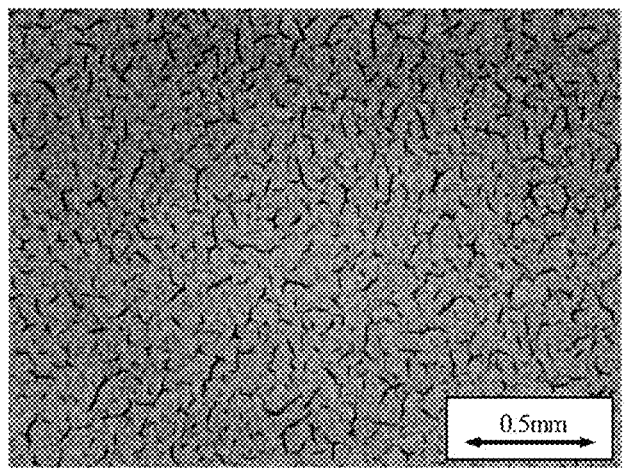
FIG. 6 is an optical micrograph of a substrate surface on which a catalyst ink produced in Comparative Example 2 is applied.
Figure 7:
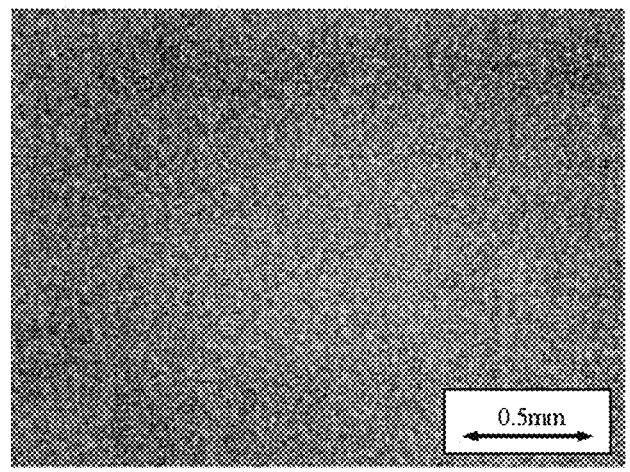
FIG. 7 is an optical micrograph of a substrate surface on which a catalyst ink produced in Example 5 is applied.

Photographs of the substrate surfaces on which the catalyst inks produced in Example 1 and 5 and Comparative Example 1 and 2 were applied, are shown in FIG. 4 (Comparative Example 1), FIG. 5 (Example 1), FIG. 6 (Comparative Example 2) and FIG. 7 (Example 5). These photographs were taken by an optical microscope.

From the images of the coated surfaces shown in FIGS. 5 and 7, it is clear that the coated surface is in good shape; excellent leveling properties are obtained; drying unevenness is not severe; and the occurrence of coating cracks is suppressed. Therefore, the catalyst inks of Examples 1 and 5 can be said to have excellent coatability.

From the images of the coated surfaces shown in FIGS. 4 and 6, it is clear that the coated surface is in poor shape; drying unevenness is severe; and many coating cracks are produced. Therefore, the catalyst inks of Comparative Examples 1 and 2 can be said to have poor coatability.
<Viscosity Measurement>

For the catalyst inks of Examples 1 to 8 and Comparative Examples 1 to 3, the viscosity at a shear rate of 150 (1/s) was measured by an E type viscometer (product name: Rheosterss 600, manufactured by: HAAKE). Bar charts of the measured viscosities of the catalyst inks are shown in FIG. 8 (Examples 1 to 4 and Comparative Examples 1 and 3) and FIG. 9 (Examples 5 to 8 and Comparative Example 2).

Figure 8:
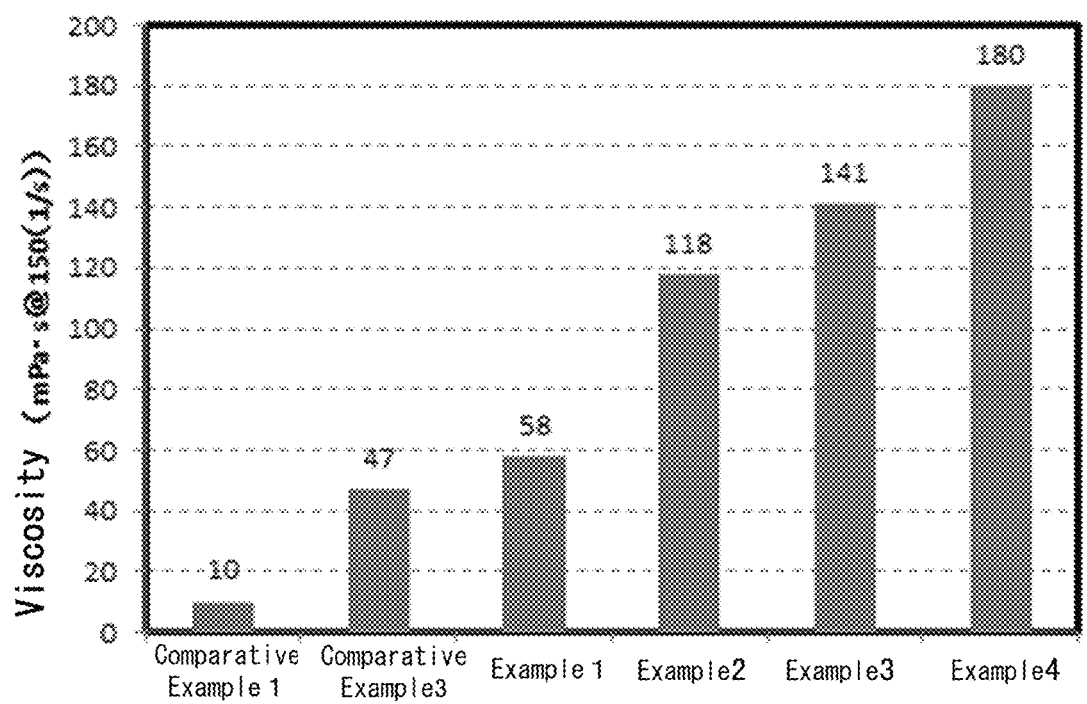
FIG. 8 is a bar chart of viscosities of catalyst inks of Examples 1 to 4 and Comparative Examples 1 and 3.

As shown in FIG. 8, the viscosity is 58 mPa·s in Example 1, 118 mPa·s in Example 2, 141 mPa·s in Example 3, 180 mPa·s in Example 4, 10 mPa·s in Comparative Example 1, and 47 mPa·s in Comparative Example 3.

Figure 9:
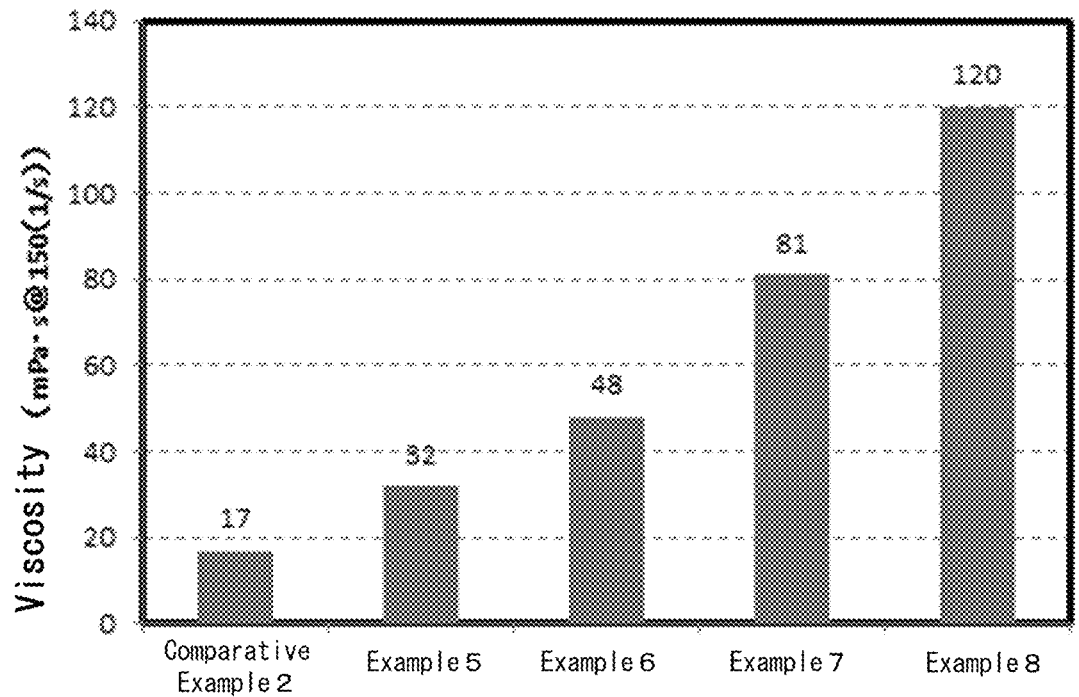
FIG. 9 is a bar chart of viscosities of catalyst inks of Examples 5 to 8 and Comparative Example 2.

As shown in FIG. 9, the viscosity is 32 mPa·s in Example 5, 48 mPa·s in Example 6, 81 mPa·s in Example 7, 120 mPa·s in Example 8, and 17 mPa·s in Example 2.
<IV Characteristics>
[High Humidity Performance Test Condition]

Cell temperature: 60° C.
Anode gas: Hydrogen gas at a relative humidity (RH) of 80% (dewpoint 55° C.)
Cathode gas: Air at a relative humidity (RH) of 80% (dewpoint 55° C.)

Fuel cells were produced by using the catalyst inks of Examples 1 to 8 and Comparative Examples 1 to 3. A high humidity performance test was carried out by causing the fuel cells to generate electricity in the above condition. Current density-voltage curves were obtained by the electricity generation.

Figure 10:
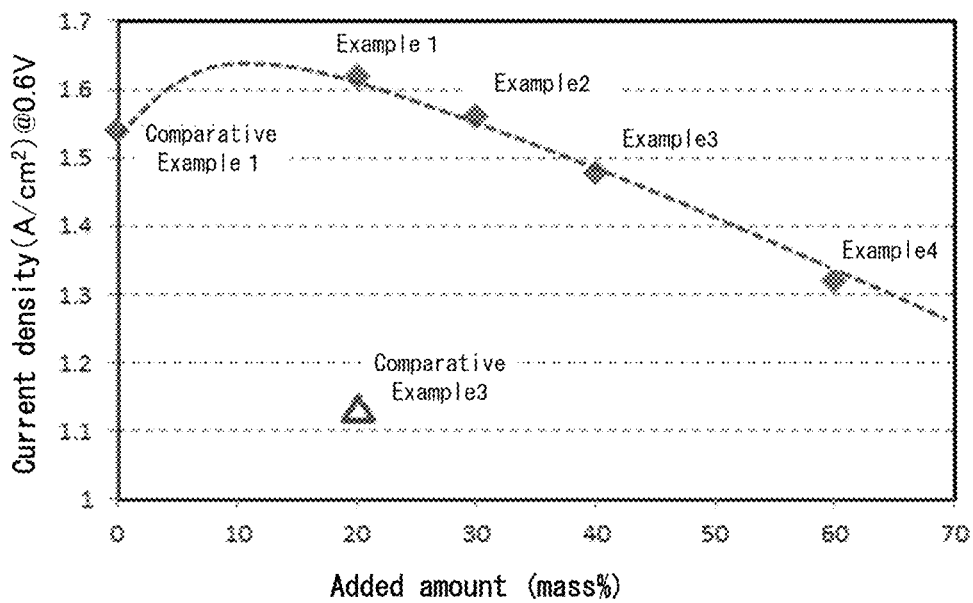
FIG. 10 is a view showing current density (A/cm$^2$) @ 0.6 V (a high load condition) with respect to added cellulose nanofiber amount (mass %) in a high humidity condition (RH 80%) for fuel cells comprising membrane electrode assemblies (MEAs) produced by using the catalyst inks of Examples 1 to 4 and Comparative Examples 1 and 3.

For the fuel cells produced by using the catalyst inks of Examples 1 to 4 and Comparative Examples 1 and 3, results showing current density (A/cm$^2$) @ 0.6 V (a high load condition) with respect to added cellulose nanofiber amount (mass %) in a high humidity condition, are shown in FIG. 10 (Examples 1 to 4 and Comparative Examples 1 and 3).

Figure 11:
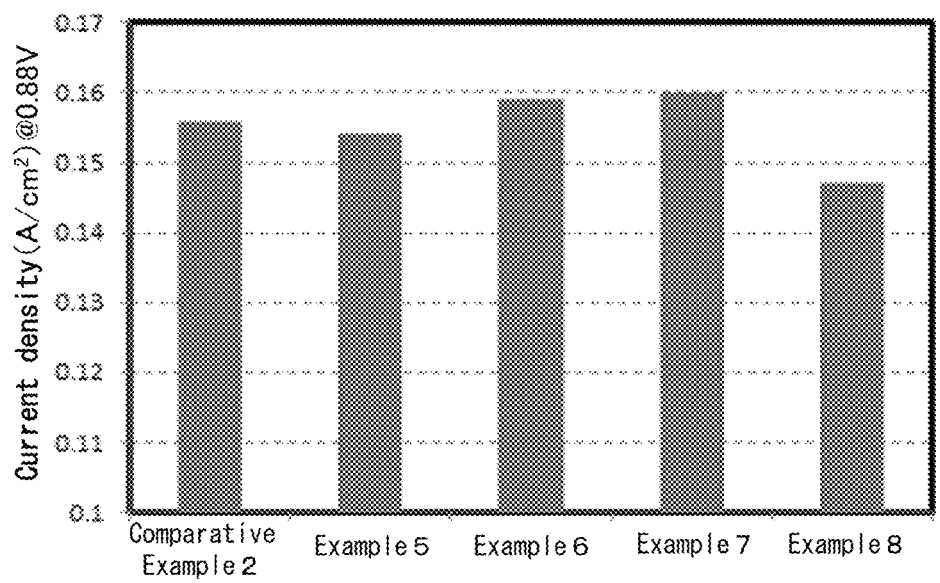
FIG. 11 is a view showing current density (A/cm$^2$) @ 0.88 V (a low load condition) with respect to added cellulose nanofiber amount (mass %) in a high humidity condition (RH 80%) for fuel cells comprising membrane electrode assemblies (MEAs) produced by using the catalyst inks of Examples 5 to 8 and Comparative Example 2.

For the fuel cells produced by using the catalyst inks of Examples 5 to 8 and Comparative Example 2, results showing current density (A/cm$^2$) @ 0.88 V (a low load condition) with respect to added cellulose nanofiber amount (mass %) in a high humidity condition, are shown in FIG. 11 (Examples 5 to 8 and Comparative Example 2).

Figure 12:
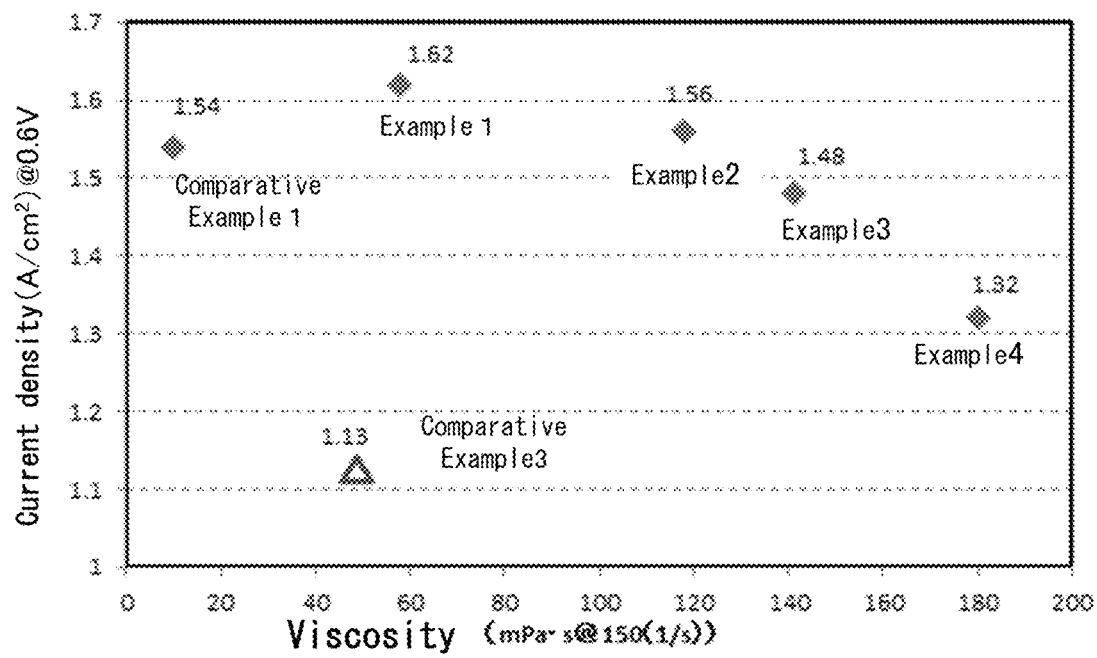
FIG. 12 is a view showing current density (A/cm$^2$) @ 0.6 V (a high load condition) with respect to catalyst ink viscosity in a high humidity condition (RH 80%) for fuel cells comprising membrane electrode assemblies (MEAs) produced by using the catalyst inks of Examples 1 to 4 and Comparative Examples 1 and 3.
Figure 13:
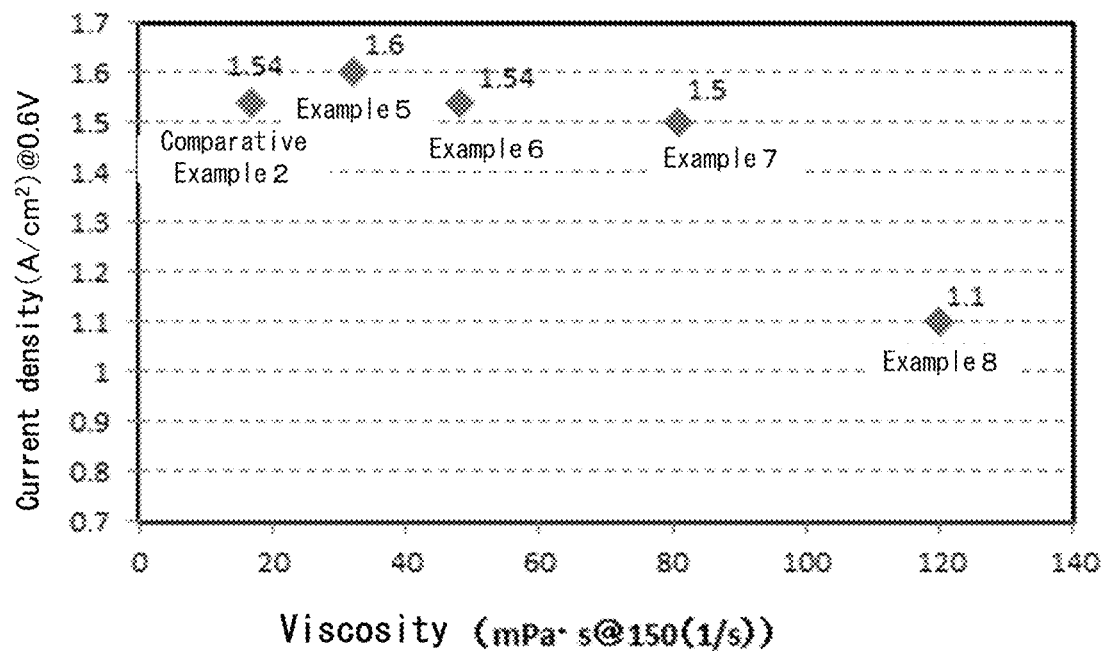
FIG. 13 is a view showing current density (A/cm$^2$) @ 0.6 V (a high load condition) with respect to catalyst ink viscosity in a high humidity condition (RH 80%) for fuel cells comprising membrane electrode assemblies (MEAs) produced by using the catalyst inks of Examples 5 to 8 and Comparative Example 2.

Also, results showing current density (A/cm$^2$) @ 0.6 V (a high load condition) with respect to catalyst ink viscosity in a high humidity condition, are shown in FIG. 12 (Examples 1 to 4 and Comparative Examples 1 and 3) and FIG. 13 (Examples 5 to 8 and Comparative Example 2).

As shown in FIG. 11, the current density in the high humidity (RH 80%)-low load (0.88 V) condition is 0.154 A/cm$^2$ in Example 5, 0.159 A/cm$^2$ in Example 6, 0.160 A/cm$^2$ in Example 7, 0.147 A/cm$^2$ in Example 8, and 0.156 A/cm$^2$ in Comparative Example 2.

As shown in FIGS. 10 and 12, the current density in the high humidity (RH 80%)-high load (0.6 V) condition is 1.62 A/cm$^2$ in Example 1, 1.56 A/cm$^2$ in Example 2, 1.48 A/cm$^2$ in Example 3, 1.32 A/cm$^2$ in Example 4, 1.54 A/cm$^2$ in Comparative Example 1, and 1.13 A/cm$^2$ in Comparative Example 3.

As shown in FIG. 13, the current density in the high humidity (RH 80%)-high load (0.6 V) condition is 1.6 A/cm$^2$ in Example 5, 1.54 A/cm$^2$ in Example 6, 1.5 A/cm$^2$ in Example 7, 1.1 A/cm$^2$ in Example 8, and 1.54 A/cm$^2$ in Comparative Example 2.

<IV Characteristics>
[Low Humidity Performance Test Condition]

Cell temperature: 80° C.

Anode gas: Hydrogen gas at a relative humidity (RH) of 25% (dewpoint 55° C.)

Cathode gas: Air at a relative humidity (RH) of 25% (dewpoint 55° C.)

Fuel cells were produced by using the catalyst inks of Examples 1 to 8 and Comparative Examples 1 to 2. A low humidity performance test was carried out by causing the fuel cells to generate electricity in the above condition. Current density-voltage curves were obtained by the electricity generation.

Figure 14:
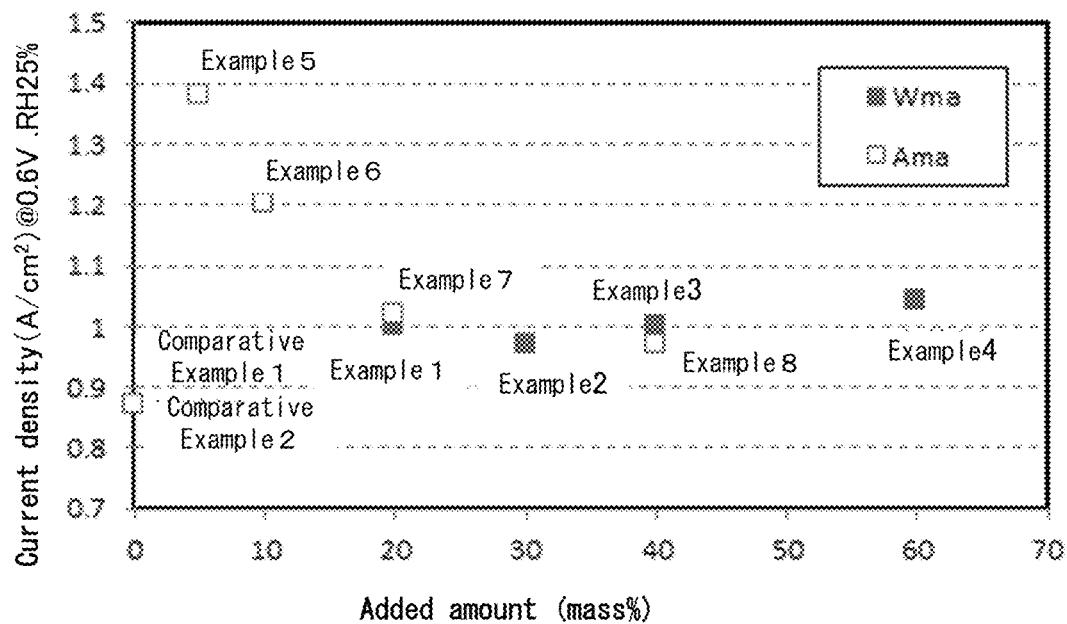
FIG. 14 is a view showing current density (A/cm$^2$) @ 0.6 V (a high load condition) with respect to added cellulose nanofiber amount (mass %) in a low humidity condition for fuel cells comprising membrane electrode assemblies (MEAs) produced by using the catalyst inks of Examples 1 to 8 and Comparative Examples 1 and 2.

For the fuel cells produced by using the catalyst inks of Examples 1 to 8 and Comparative Examples 1 and 2, results showing current density (A/cm$^2$) @ 0.6 V (a high load condition) with respect to added cellulose nanofiber amount (mass %) in a low humidity condition, are shown in FIG. 14. Since the current density values of Comparative Examples 1 and 2 in the low humidity-high load condition, were the same, a mark indicating Comparative Example 1 overlaps with a mark indicating Comparative Example 2 and is not seen in FIG. 14.

Figure 15:
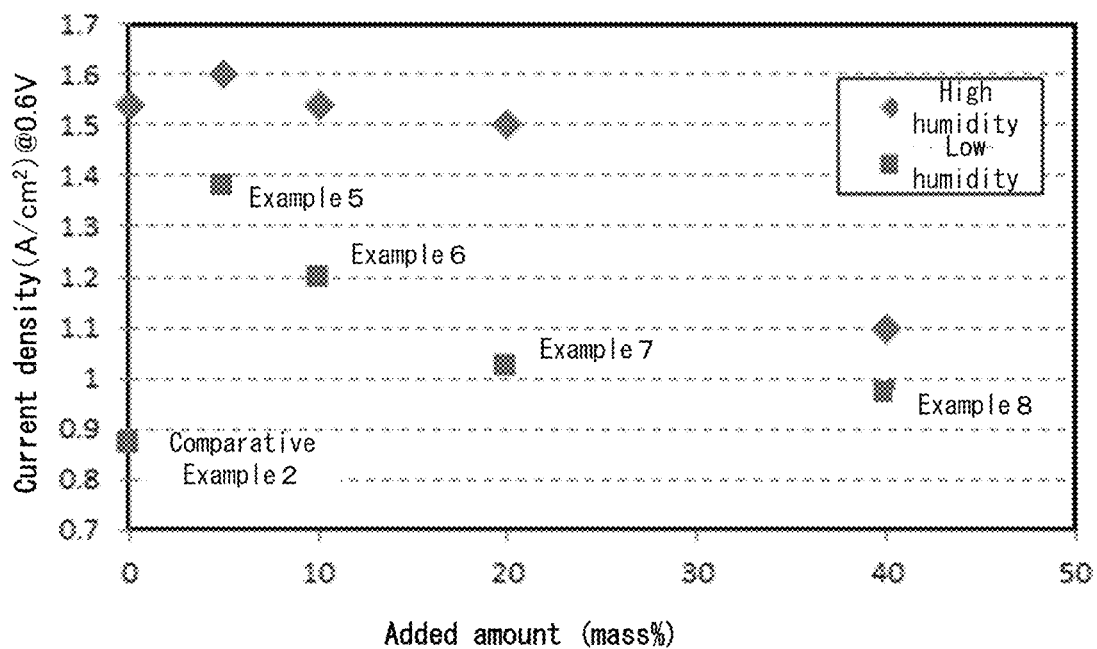
FIG. 15 is a view showing high humidity (RH 80%)-high load (0.6 V) performance test results and low humidity (RH 25%)-high load (0.6 V) performance test results for fuel cells comprising membrane electrode assemblies (MEAs) produced by using the catalyst inks of Examples 5 to 8 and Comparative Example 2.

For the fuel cells produced by using the catalyst inks of Examples 5 to 8 and Comparative Example 2, both high humidity-high load performance test results and low humidity-high load performance test results are shown in FIG. 15.

As shown in FIG. 14, the current density in the low humidity (RH 25%)-high load (0.6 V) condition is 1.00 A/cm$^2$ in Example 1, 0.97 A/cm$^2$ in Example 2, 1.00 A/cm$^2$ in Example 3, 1.04 A/cm$^2$ in Example 4, 0.87 A/cm$^2$ in Comparative Example 1, 1.38 A/cm$^2$ in Example 5, 1.20 A/cm$^2$ in Example 6, 1.02 A/cm$^2$ in Example 7, 0.97 A/cm$^2$ in Example 8, and 0.87 A/cm$^2$ in Comparative Example 2.

[High Humidity-High Load Performance Evaluation]

As shown in FIGS. 10 and 12, in the high humidity (RH 80%)-high load (0.6 V) condition, the fuel cells of Examples 1 to 4 show equivalent performance to the fuel cell of Comparative Example 1. From this, it is presumed that a decrease in gas diffusion performance of the fuel cell due to the use of the catalyst ink added with the cellulose-based nanofibers, is small.

Meanwhile, as shown in FIGS. 10 and 12, for the fuel cell of Comparative Example 3 produced by using PVA, it is clear that the electricity generation performance in the high humidity (RH 80%)-high load (0.6 V) condition decreases compared to the fuel cell of Comparative Example 1.

Therefore, it is presumed that by adding PVA to increase the amount of PVA added, gas supply is inhibited to decrease the electricity generation performance.

For the fuel cell of Comparative Example 3, it is also clear that the electricity generation performance in the high humidity (RH 80%)-high load (0.6 V) condition decreases compared to the fuel cells of Examples 1 to 4.

Therefore, it is clear that a decrease in electricity generation performance of the fuel cell in the high humidity (RH 80%)-high load (0.6 V) condition, can be more suppressed by adding the cellulose-based nanofibers to the catalyst ink, rather than by adding PVA, with keeping the viscosity of the catalyst ink at a desired level.

As shown in FIGS. 13 and 15, in the high humidity (RH 80%)-high load (0.6 V) condition, the fuel cells of Examples 5 to 8 show equivalent performance to the fuel cell of Comparative Example 2. From this, it is presumed that a decrease in gas diffusion performance due to the use of the catalyst ink added with the cellulose-based nanofibers, is small.

[High Humidity-Low Load Performance Evaluation]

As shown in FIG. 11, in the high humidity (RH 80%)-low load (0.88 V) condition, the fuel cells of Examples 5 to 8 show equivalent performance to the fuel cell of Comparative Example 2. From this, it is presumed that a decrease in catalytic activity due to the use of the catalyst ink added with the cellulose-based nanofibers, is small.

[Low Humidity-High Load Performance Evaluation]

As shown in FIG. 14, in the low humidity-high load condition, the fuel cells of Examples 1 to 8 are higher in current density than the fuel cells of Comparative Examples 1 and 2. From this, it is presumed that the gas diffusion performance of the fuel cell can be increased by using the catalyst ink added with the cellulose-based nanofibers.

It was also confirmed that in the low humidity (RH 25%)-high load (0.6 V) condition, excellent electricity generation performance can be obtained when F/I is 0.6 or less.

In addition, as shown in FIG. 14, it is clear that for the fuel cells of Examples 5 to 7 comprising Ama-100, the current density is 1.59 times higher in the fuel cell of Example 5, 1.38 times higher in the fuel cell of Example 6, and 1.17 times higher in the fuel cell of Example 7, than in the fuel cells of Comparative Examples 1 and 2.

Therefore, it was confirmed that by adding Ama-100 to the catalyst ink so that F/I is 0.05 or more and 0.2 or less, electricity generation performance in the low humidity (RH 25%)-high load (0.6 V) condition can be remarkably increased.

This is presumed to be because, since the cellulose-based nanofibers with a polymerization degree of from 200 to 300 have very high water retention performance, by adding the cellulose-based nanofibers to the catalyst ink, the water retention ability of the catalyst is increased to increase the low humidity performance of the fuel cell.

From the above results, it is presumed that by adding the cellulose-based nanofibers with a polymerization degree of from 200 to 300 (e.g., Ama-100) to the catalyst ink so that F/I is 0.05 or more and 0.2 or less, electricity generation performance in the low humidity (RH 25%)-high load (0.6 V) condition can be remarkably increased.

From the above, it was confirmed that the fuel cells of Examples 1 to 4 can obtain excellent electricity generation performance in the high humidity-high load condition and the low humidity-high load condition, while securing excellent coatability by virtue of the viscosity and dispersion of the catalyst ink.

It was also confirmed that the fuel cells of Examples 5 to 8 can obtain excellent electricity generation performance in all of the high humidity-high load condition, the high humidity-low load condition, and the low humidity-high load condition, while securing excellent coatability by virtue of the viscosity and dispersion of the catalyst ink. It was also confirmed that the fuel cells of Examples 5 to 8 can obtain very excellent electricity generation performance, especially in the low humidity-high load condition.

REFERENCE SIGNS LIST

21. Electrolyte membrane
22. Cathode catalyst layer
23. Anode catalyst layer
24, 25. Gas diffusion layer
26. Cathode electrode
27. Anode electrode
28. Membrane electrode assembly
29, 30. Separator
31, 32. Gas channel
200. Fuel cell

The invention claimed is:

1. A catalyst ink for a fuel cell, comprising a catalyst-supporting support, an ionomer that is proton conductive, and cellulose-based nanofibers,
wherein a mass ratio (F/I) of the cellulose-based nanofibers (F) to the ionomer (I) is 0.1 or more and 0.4 or less ($0.1 \leq (F/I) \leq 0.4$).

2. The catalyst ink for a fuel cell according to claim 1, wherein the cellulose-based nanofibers are one or more kinds of fibers selected from the group consisting of cellulose nanofibers containing an unsubstituted hydroxy group, cellulose nanofibers containing a hydroxy group substituted with an acetyl group or a derivative thereof, cellulose sulfate nanofibers, cellulose phosphate nanofibers, and cellulose nanofibers containing a hydroxy group substituted with a C1-C10 alkyl group or a derivative thereof.

3. The catalyst ink for a fuel cell according to claim 1, wherein the ionomer is a perfluorosulfonic acid-based resin.

4. The catalyst ink for a fuel cell according to claim 1, wherein a viscosity of the catalyst ink measured by an E type viscometer at a shear rate of 150 (1/s) is from 58 mPa·s to 180 mPa·s.

5. The catalyst ink for a fuel cell according to claim 1, wherein a polymerization degree of the cellulose-based nanofibers is from 200 to 750.

6. The catalyst ink for a fuel cell according to claim 5, wherein the mass ratio (F/I) of the cellulose-based nanofibers (F) to the ionomer (I) is 0.1 or more and 0.2 or less ($0.1 \leq (F/I) \leq 0.2$), and the polymerization degree of the cellulose-based nanofibers is from 200 to 300.

7. A catalyst layer for a fuel cell, comprising a catalyst-supporting support, an ionomer that is proton conductive, and cellulose-based nanofibers,
wherein a mass ratio (F/I) of the cellulose-based nanofibers (F) to the ionomer (I) is 0.1 or more and 0.4 or less ($0.1 \leq (F/I) \leq 0.4$).

8. The catalyst layer for a fuel cell according to claim 7, wherein the cellulose-based nanofibers are one or more kinds of fibers selected from the group consisting of cellulose nanofibers containing an unsubstituted hydroxy group, cellulose nanofibers containing a hydroxy group substituted with an acetyl group or a derivative thereof, cellulose sulfate nanofibers, cellulose phosphate nanofibers, and cellulose nanofibers containing a hydroxy group substituted with a C1-C10 alkyl group or a derivative thereof.

9. The catalyst layer for a fuel cell according to claim 7, wherein the ionomer is a perfluorosulfonic acid-based resin.

10. The catalyst layer for a fuel cell according to claim 7, wherein a polymerization degree of the cellulose-based nanofibers is from 200 to 750.

11. The catalyst layer for a fuel cell according to claim 10, wherein the mass ratio (F/I) of the cellulose-based nanofibers (F) to the ionomer (I) is 0.1 or more and 0.2 or less ($0.1 \leq (F/I) \leq 0.2$), and the polymerization degree of the cellulose-based nanofibers is from 200 to 300.

12. A membrane electrode assembly comprising: a cathode electrode containing a cathode catalyst layer; an anode electrode containing an anode catalyst layer; and an electrolyte layer disposed between the cathode catalyst layer and the anode catalyst layer, wherein at least one of the cathode catalyst layer and the anode catalyst layer is the catalyst layer for a fuel cell defined by claim 7.

* * * * *